United States Patent
Silc et al.

(10) Patent No.: US 6,230,458 B1
(45) Date of Patent: May 15, 2001

(54) FIRE-RESISTANT COMPOSITE SLAB, A PROCESS FOR ITS PRODUCTION AS WELL AS ITS USE

(75) Inventors: Milan Silc, Trzin; Iva Marolt, Cerknica, both of (SI)

(73) Assignee: Mineralka D.O.O., Cerknica (SI)

( * ) Notice: Subject to any disclaimer, the term of this patent is extended or adjusted under 35 U.S.C. 154(b) by 0 days.

(21) Appl. No.: 09/403,041

(22) PCT Filed: Apr. 23, 1998

(86) PCT No.: PCT/IB98/00952

§ 371 Date: Oct. 25, 1999

§ 102(e) Date: Oct. 25, 1999

(87) PCT Pub. No.: WO98/49004

PCT Pub. Date: Nov. 5, 1998

(30) Foreign Application Priority Data

Apr. 28, 1997 (EP) ................................. 97107034

(51) Int. Cl.[7] .................................................. E04C 2/02
(52) U.S. Cl. ............................................. 52/232; 52/612
(58) Field of Search ..................... 52/232, 612, DIG. 7, 52/309.3, 309.15

(56) References Cited

U.S. PATENT DOCUMENTS

| | | | |
|---|---|---|---|
| 4,363,199 | * 12/1982 | Kucheria et al. | 52/232 X |
| 4,477,094 | 10/1984 | Yamamoto et al. | |
| 4,485,601 | * 12/1984 | De Boel | 52/232 |
| 4,723,385 | * 2/1988 | Kallstrom | 52/232 |
| 4,955,171 | * 9/1990 | Kossatz et al. | 52/612 |
| 5,750,927 | * 5/1998 | Baltazar | 52/232 X |
| 5,947,159 | * 9/1999 | Takahashi | 52/232 X |
| 5,950,376 | * 9/1999 | Kemeny et al. | 52/232 X |
| 6,003,274 | * 12/1999 | Wycech | 52/232 |
| 6,061,985 | * 5/2000 | Kraus et al. | 52/232 |

FOREIGN PATENT DOCUMENTS

| | | |
|---|---|---|
| 590798 | 8/1977 | (CH) . |
| 2600024 | 7/1973 | (DE) . |
| 2700217 | 7/1978 | (DE) . |
| 2700608 | 7/1978 | (DE) . |
| 3206218 | 9/1983 | (DE) . |
| 0043144 | 7/1991 | (EP) . |

* cited by examiner

Primary Examiner—Peter M. Cuomo
Assistant Examiner—Rodney B. White
(74) Attorney, Agent, or Firm—Bacon & Thomas

(57) ABSTRACT

A fire-resistant composite slab, especially one that is composed of three layers, which has a central layer made of glued, inorganic expanded materials combined with inorganic fiber-containing fillers. Outer layers in the form of slabs are provided on both sides of the central layer. These comprise at least two layers of glued expanded materials between which a continuous, flat reinforcement layer is provided. The fire-resistant composite slab can be used in constructing the interiors of buildings and ships.

5 Claims, 1 Drawing Sheet

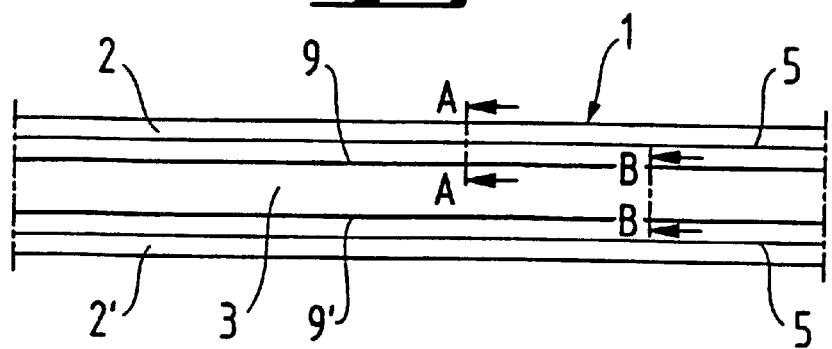
Fig. 1
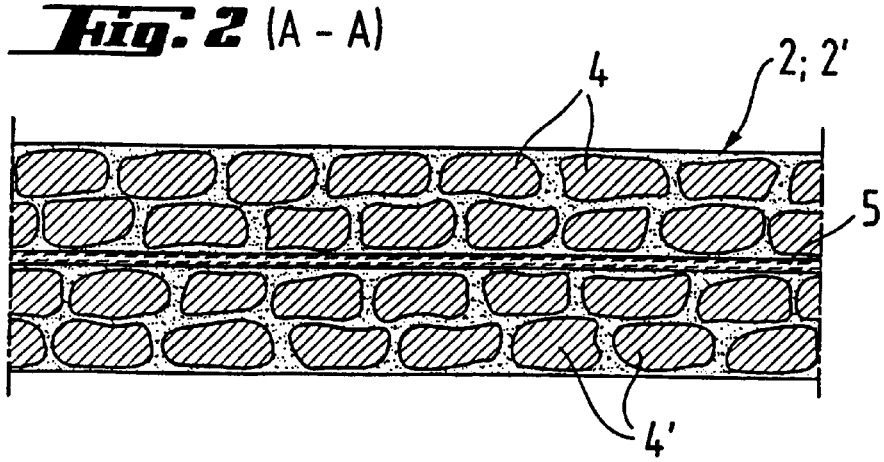
Fig. 2 (A - A)
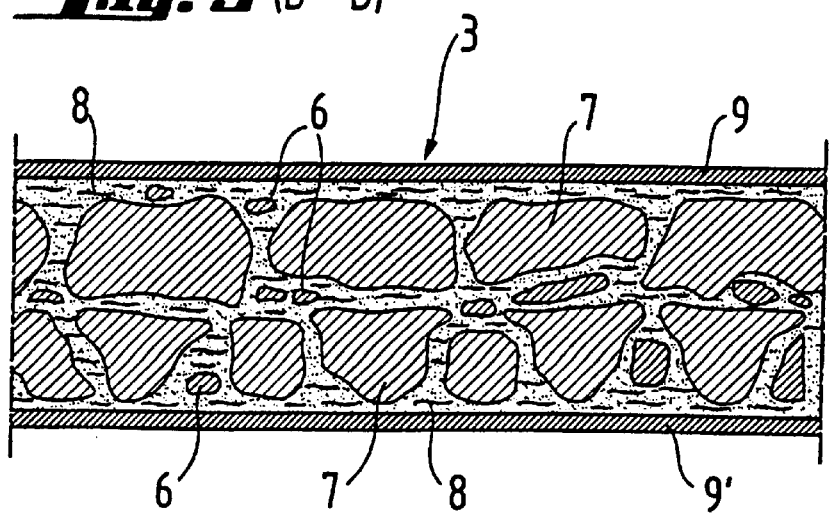
Fig. 3 (B - B)

FIRE-RESISTANT COMPOSITE SLAB, A PROCESS FOR ITS PRODUCTION AS WELL AS ITS USE

BACKGROUND OF THE INVENTION

1. Field of the Invention

The invention pertains to a refractory composite slab comprising three layers that consist essentially of inorganic expanded materials of various grain sizes, such as expanded vermiculite, which are glued with bonding agents and subsequently compressed, where at least two layers of such expanded materials are provided, between which a flat reenforcement layer is located, as well as its use.

2. Description of Related Art

Three-layer slab composites of the above-mentioned type have been known to the art previously, for instance, from CH-A-590 798. These, however, are not fire-resistant because they contain a core layer of magnesite-cemented wood wool.

A process for the production of non-combustible fire-resistant slab composites that are composed of three layers comprised of expanded materials, such as vermiculite and perlite, has already been known to the art from EP-A1-43144. In this slab composite, each material forms a slab layer of its own. In order to manufacture the individual slab layers, a granulate composed of the above-mentioned inorganic expanded materials is mixed with a binder material, which may be based, for instance, on thermosetting resins in a combination with phosphates. Having been treated in this manner, the granulate is then compressed into slabs.

Due to the exclusive use of inorganic materials, the finished fire-resistant slab composites have a high weight, as well as relatively high stiffness values. Consequently, their further processing, for instance in the context of the usual molding processes, ranges from difficult to impossible.

Therefore, in accordance with DE-A-26 00 024, the amount of inorganic expanded materials was reduced by providing layers made of fibrous media that were bonded with a binder. It is true that, as a result, the weight of the slab is reduced; however, international fire protection standards can no longer be met.

SUMMARY OF THE INVENTION

Therefore, it is the object of the present invention to provide a fire-resistant slab composite that can be processed further within the context of the usual molding processes, making it possible to achieve the desired mechanical sound insulating and water-resistant characteristics at a relatively low weight while at the same time meeting international fire protection regulations.

Therefore, in accordance with the invention, a three-layer fire-resistant slab composite of the kind mentioned at the outset is provided, which is characterized by the fact that the core layer is a slab comprised of glued expanded materials of various grain sizes combined with inorganic fiber-containing fillers, and which, on both sides of this core layer, outer layers are provided in the form of slabs comprised of at least two layers of glued expanded materials, between which there is present a continuous flat reinforcement layer which is highly resistant to mechanical stress.

Moreover, the three-layer fire-resistant slab composite in accordance with the invention has the advantage that the reinforcing layer is a mechanically deformable metal layer, woven fabric, knitted fabric, or fibrous web of organic and/or inorganic fibers.

In addition, metal foils can be provided on both sides of the core layer in an advantageous manner. In accordance with the invention, the three-layer fire-resistant slab composite is used for construction purposes in the interior of buildings and ships.

The invention will now be explained in greater detail by means of FIGS. 1–3.

BRIEF DESCRIPTION OF THE FIGURES OF DRAWINGS

FIG. 1 is a side view of a three-layer fire-resistant slab in accordance with the invention.

FIG. 2 is a cross-sectional view of a portion of the slab of FIG. 1, taken along lines A—A.

FIG. 3 is a cross-sectional view of a portion of the slab of FIG. 1 taken along lines B—B.

DETAILED DESCRIPTION OF THE PREFERRED EMBODIMENT

FIG. 1 depicts a three-layer fire-resistant slab composite (1). It is provided with the core layer (3) that essentially corresponds in its composition with FIG. 3. The core layer (3) is provided with the outer layers (2, 2') on both sides, which essentially correspond with FIG. 2. The outer layers (2, 2') are each provided with the reinforcement layer (5). FIG. 2 shows the outer layers (2, 2') enlarged in a section along line A—A in FIG. 1. They are comprised of layers (4, 4'), which consist of glued expanded (blown) vermiculite. The reinforcement layer (5) is provided between these layers (4 and 4').

In FIG. 3, the core layer (3) is depicted enlarged in a section along line B—B in FIG. 1. In that Figure, the vermiculite particles with a smaller grain size are referred to by reference number 6, while the vermiculite particles with a larger grain size are indicated by reference number 7. The inorganic, fiber-containing fillers or perlite (8) are provided between the said vermiculite particles.

The invention will now be explained in greater detail by means of an example.

The three-layer slab (1) in accordance with the invention is manufactured, for example, by feeding the vermiculite, of the various origins and various grain sizes indicated by reference numbers 4, 5 and 6, to an oven. The heat-treating temperature is 800 to 850 degrees Celsius, depending upon which type of vermiculite is present and the grain size of the vermiculite particles. The volume of the vermiculite particles is increased by an eight- to ten-fold value relative to their original size. Impurities are removed before the vermiculite particles are fed or supplied to the mixing equipment.

In the mixing equipment, the vermiculite particles are glued with binders. The binders used are, for instance, urea-formaldehyde resins, silicates (water glass), and phosphates, as well as their mixtures.

The binders are used in the form of a solution; the binder content is in the range of 40 to 70[%]. Thus the binder content in the outer layers (2, 2') is in a range from 15 to 30%, and in the core layer (3) it ranges from 15 to 30%.

After glueing, the binder content in the outer layer (2, 2') is approximately 20%.

The binder content in the core layer is also about 20%.

The outer layers (2, 2') are, for instance, produced as follows:

A cake of the glued vermiculite particles (4) is poured on a conveyor belt and the reinforcement layer (5) is manually deposited on this heap. This reinforcing layer (5) may be, for instance, a mat or a network of carbon, glass, or metal fibers of varying thickness and web structure.

Next, this poured cake is fed to a discontinuously operating press and is compressed at a temperature of 160° Celsius and a compacting pressure of 150 to 200 N/cm². With the set-up according to FIG. 2, a semi-finished product is produced. On one hand, it can be employed as a final product or it is further used for the manufacture of the slab composite, for instance, in accordance with FIG. 1.

In order to produce the core layer (3), glued vermiculite particles (6, 7) of various grain sizes are mixed with inorganic, fiber-containing fillers in a mixer. The grain size of the smaller vermiculite particles (6) is in the range from 0.350 to 3 mm. The grain size of the larger vermiculite particles ranges from 1 to 2.5 mm. As inorganic, fiber-containing fillers (8), rock wool or perlite can be mixed in, for instance. In the finished slab, they serve as sound-, cold-, and heat-insulators. In order to further enhance sound insulation, a metal foil (9, 9') can be provided on both sides of the core layer (3), the thickness of which is in a range of 0.075 mm to 0.15 mm.

From this mixture, a poured cake is likewise produced, which is transferred to a discontinuous press in which it is processed into a semi-finished product at a temperature of 130° Celsius and a compacting pressure of 150 to 200 N/cm².

This semi-finished product can now be employed for the following purposes:

as a final product, for instance, as a fire-protection slab or as a semi-finished product in a slab composite in accordance with FIG. 1.

The slab composite (1) in accordance with the invention is now manufactured from the semi-finished products (2, 2') with which the outer layers are formed, and from the semi-finished product (3) that forms the core layer.

In this process, a pressed stack is formed in such a way that the outer layers (2, 2') enclose the core layer (3) on both sides. This pressed stack is compressed inside a press in the cold-press process.

To glue them together, a flame-resistant polyurethane adhesive is used.

The improved product characteristics of the slab composite (1) in accordance with the invention will now be compared to a three-layer slab composite named NEGOR®, which is generally known to the art, and which consists exclusively of inorganic materials.

The results can be found in the following table:

|  | NEGOR ® | SLAB 1 |
| --- | --- | --- |
| Number of layers | 3 | 3 |
| % binders in outer layer | 40 | 22 |
| % binders in inner layer | 23 | 20 |
| Reinforcements | / | 4 |
| Thickness, mm | 19 | 19 |
| Volumetric weight, kg/m$^n$ | 840 +/− 10% | 580 +/− 10% |
| Flexural strength, MPa | 4–5 | 10–11 |
| Non-flammability | YES | YES |
| Sound insulation, dB | 27 | 32 |
| Water-repellent | NO | YES |

It can be seen from the table that the binder content of the slab composite in accordance with the invention is substantially less than that of the slab with the brand name NEGOR®, which has already been known to the art and which consists of purely inorganic expanded materials. Nevertheless, surprisingly, the mechanical properties can be retained, and this is the case because of the reinforcement layer (5). By virtue of this reinforcement layer, the weight of the slab composite is also lower than that of the NEGOR® slab, which results in advantages in terms of construction technology.

Moreover, the value of the flexural strength is higher, so that the slab composite (1) in accordance with the invention can be molded more easily than the NEGOR® slab.

Owing to these improved technical parameters, the slab composite in accordance with the invention can be employed for the interior construction of ships and buildings in an easily manageable manner, while international fire-protection standards are met as well.

What is claimed is:

1. Fire-resistant slab composite on the basis of three layers which are one core and two outer layers, consisting essentially of inorganic expanded materials of various grain sizes, which are glued together with binders and then compressed, where at least two layers of such expanded materials are provided, between which a flat reinforcement layer is located, wherein the core layer is a slab comprised of glued expanded vermiculite of various grain sizes combined with inorganic, fiber-containing fillers, and wherein on both sides of this core layer, outer layers have been provided in the form of slabs that comprise at least two layers of glued expanded vermiculite between which the reinforcement layer is present which is continuously flat and resistant to mechanical stress.

2. Fire-resistant slab composite in accordance with claim 1, wherein the reinforcement layer is a metal layer which is mechanically moldable.

3. Fire-resistant slab composite in accordance with claim 1, wherein the reinforcement layer is a woven layer or non-woven fabric or a fleece comprised of organic and/or inorganic fibers.

4. Fire-resistant slab composite on the basis of three layers which are one core and two outer layers in accordance with claim 1, wherein metal foils are provided on both sides of the core layer.

5. A fire resistant slab composite which comprises a core disposed between two outer layers; said core being a slab which comprises expanded vermiculite of various grain sizes and inorganic fiber containing filler, said expanded vermiculite and filler being glued together with binder and compressed; each of said outer layers being in the form of a slab which comprises at least two layers of glued expanded vermiculite with a reinforcement layer located between said two layers of glued expanded vermiculite; said reinforcement layer being continuously flat and resistant to mechanical stress.

* * * * *